INVENTOR.
Edward E. Thomas,
BY Morsell & Morsell
ATTORNEYS.

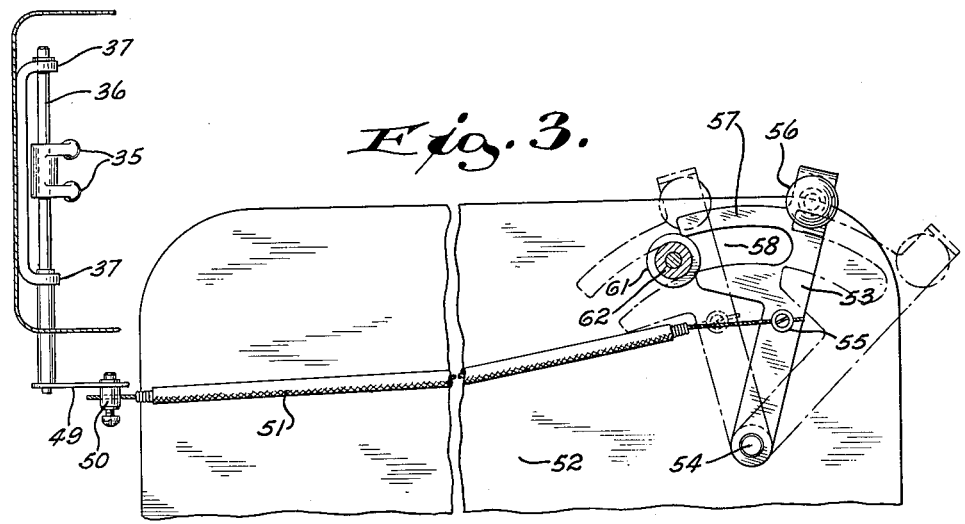
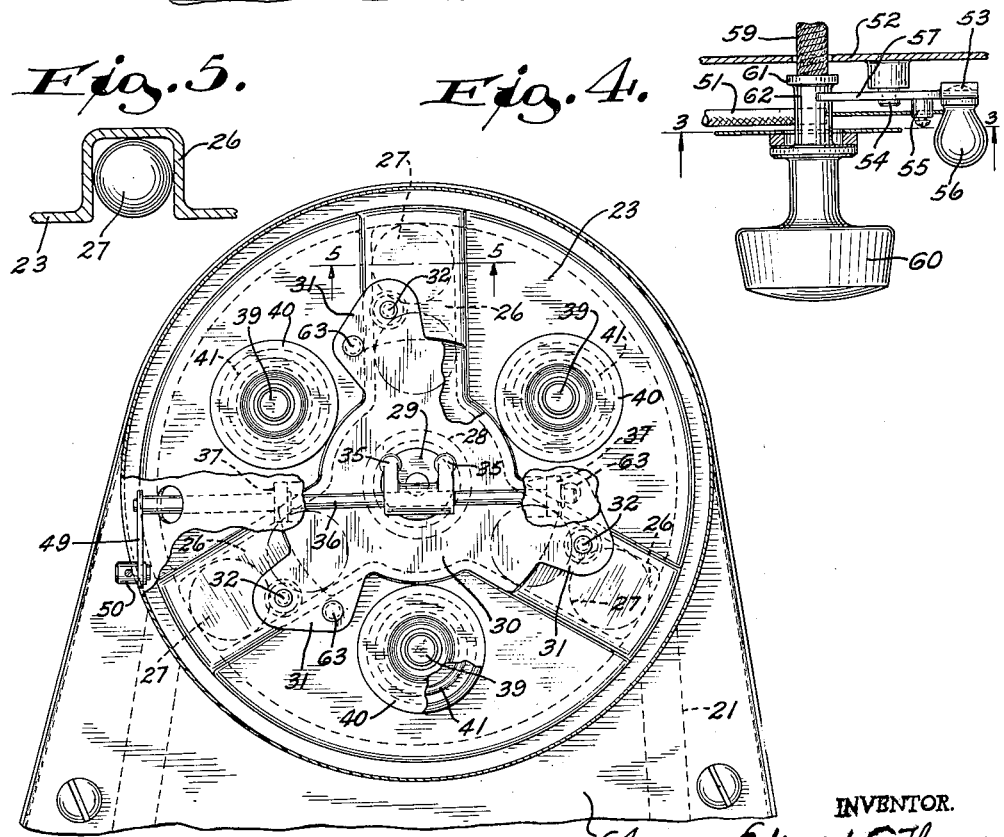

BY Edward E. Thomas,
Morsell & Morsell
ATTORNEYS

United States Patent Office 2,987,934
Patented June 13, 1961

2,987,934
MOTOR VEHICLE AUTOMATIC
TRANSMISSIONS
Edward E. Thomas, Milwaukee, Wis., assignor to Harley-Davidson Motor Co., Milwaukee, Wis., a corporation of Wisconsin
Filed Apr. 1, 1959, Ser. No. 803,388
7 Claims. (Cl. 74—230.17)

This invention relates to improvements in motor vehicle automatic transmissions, and more particularly to an automatic power transmission of compact, light and inexpensive form particularly suited for light-weight motor vehicles such as motor scooters, motor tricycles, small motor cars, and the like.

A primary object of the present invention is to provide an automatic power transmission for motor vehicles wherein the power transmission, of continuously variable ratio, depends upon the effective diameters of variable driving and driven pulleys or sheaves, with the ratio being automatically determined and adjusted by means of speed responsive mechanism associated with the driving pulley co-acting with torque responsive mechanism associated with the driven pulley.

A further object of the invention is to provide an automatic power transmission of the character described in which the power is transmitted by an endless belt engaging pulleys of oppositely variable radii and wherein speed responsive means operate to vary said radii.

A further object of the invention is to provide an automatic power transmission for motor vehicles wherein the variable primary or driving sheaves is varied as to its effective radius by centrifugal means, but the means for connecting said variable primary sheave to the driving shaft comprises a series of reciprocal pins.

A further object of the invention is to provide, in an automatic power transmission having centrifugal means for varying the effective radius of the driving sheave, means for locking out said centrifugal means to temporarily prevent power transmission so that the motor of the vehicle can be initially speeded up, prior to obtaining forward motion of the vehicle.

A further object of the invention is to provide, in an automatic power transmission for motor vehicles having a manual control level for selectively locking out the centrifugal means acting on the variable primary sheave, means acting in conjunction with the centrifugal lock-out control lever arrangement for permitting free actuation of the rewind starter in its "start" position, but which, when said control lever is in its "run" position releasing the lock-out of the of the centrifugal means, automatically locks the handle of the rewind starter to prevent operation thereof.

A further object of the invention is to provide, in an automatic power transmission of the character described, means associated with the sliding section of the primary variable sheave for manually moving said sliding sheave section into belt engagement whereby the vehicle's engine may be started through the power transmission device by pushing the vehicle.

A further object of the invention is to provide an automatic power transmission for motor vehicles for transmitting power from the motor to the driving wheels of the vehicle, which transmission is automatically speed responsive, which is strong and durable, which is light and compact, which is efficient in operation, and which is well adapted for the purposes described.

With the above and other objects in view, the invention consists of the improved automatic power transmission, and its parts and combinations as set forth in the claims, and all equivalents thereof.

In the accompanying drawings, in which the same reference characters indicate the same parts in all of the views:

FIG. 2 is a fragmentary view taken from the left-hand end of FIG. 1 with a portion of the casing broken away and in section showing the control and centrifugal mechanism for the primary driving sheave;

FIG. 3 is a fragmentary view looking at a face of the control panel showing the Bowden control and its manual shift lever for moving the lock-out spider and attached pins of the transmission control means associated with the driving bell, and the lock for the rope starter handle; the view being taken approximately along the line 3—3 of FIG. 4;

FIG. 4 is a horizontal sectional view through the control panel showing the manual control lever and the locking means for the rope starter handle;

FIG. 5 is a fragmentary detail sectional view taken on line 5—5 of FIG. 4 showing one of the confining channels for the centrifugal balls which automatically contact and slide the shiftable section of the primary sheave;

Figure 1:
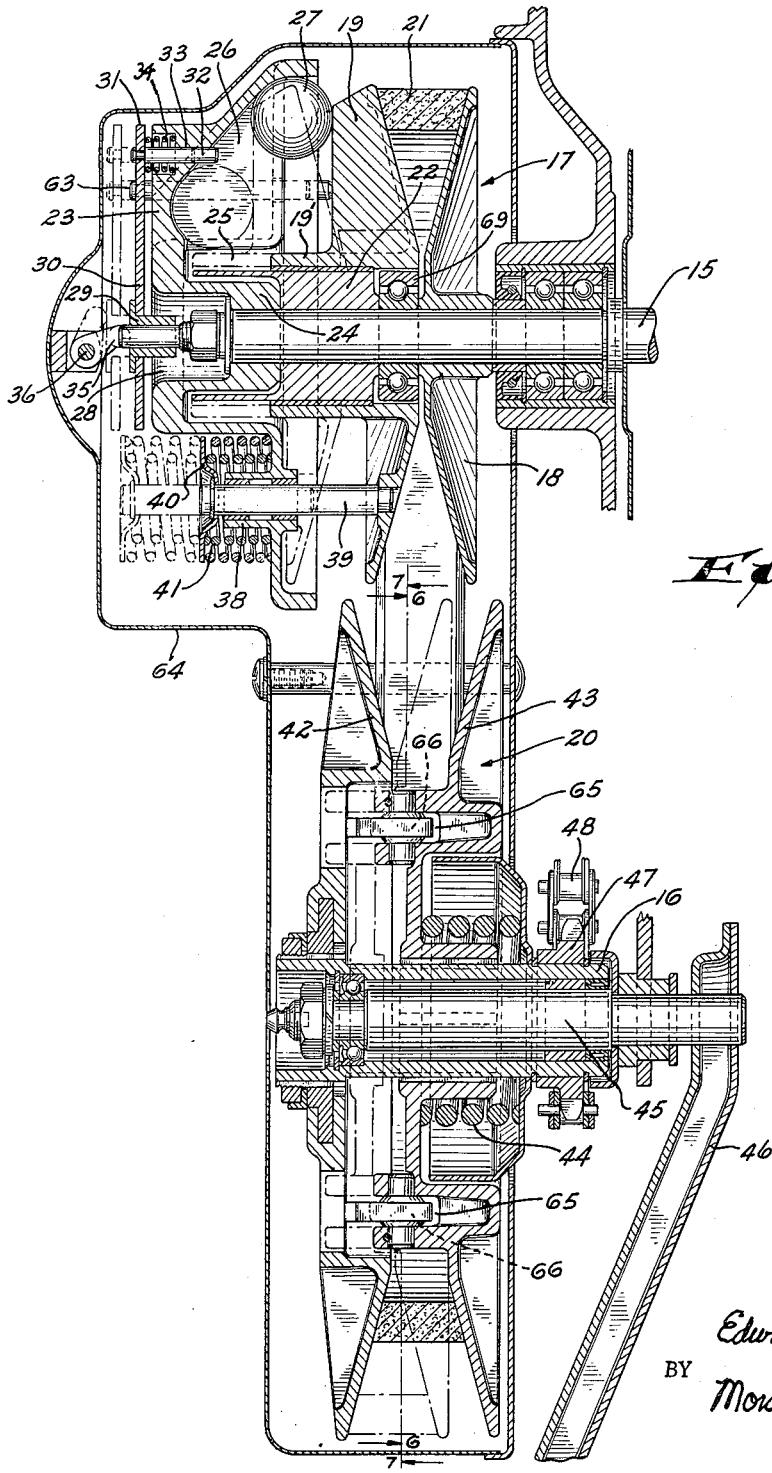
FIG. 1 is a vertical sectional view taken through the improved automatic transmission including the driving and driven variable sheaves, the operating and control mechanism for the primary driving sheave, and a portion of the enclosing housing.

Referring now more particularly to FIG. 1 of the drawings, it will appear that the improved automatic power transmission is adapted to drivably interconnect a driving shaft 15 and a driven shaft 16. The automatic power transmission finds particular utility in connection with a light motor vehicle, such as a motor scooter, wherein the driving shaft 15 may be coupled to or constitute an extension of the crank shaft of the internal combustion engine of the vehicle (not shown), while the driven shaft 16 may be coupled to or form an extension of the drive or jack shaft for transmitting power to the driving wheel or wheels of the motor vehicle. It should be understood, however, that the automatic power transmission is well adapted to drivably interconnect the driving and driven shafts of various types of power driven mechanisms.

The primary or driving variable sheave of the present apparatus is indicated generally by the numeral 17 and the fixed section 18 thereof is carried fast by the driving shaft 15. The numeral 19 designates the shiftable section of the primary sheave 17 whose mounting will be discussed hereinafter.

The driven sheave of the assemblage is indicated generally by the numeral 20 and it is secured onto the driven shaft 16. An endless belt 21 connects the driving and driven sheaves 17 and 20. The variable sheaves 17 and 20 and the associated mechanism are enclosed by a suitable housing 64.

The axially shiftable section 19 of the primary or driving sheave 17 is slidably mounted on a hub 22 which is loosely mounted on an intermediate portion of the driving shaft 15. A driving bell is indicated generally by the numeral 23 and this driving bell has a central hub portion 24 mounted fast on a portion of the driving shaft 15. The inner side of the hub portion 24 is provided with an annular pocket 25 adapted to receive the reduced hub portion 19' of the sliding sheave section 19 when the latter slides axially on the hub 22 or toward the left relative to FIG. 1 to change the effective diameter of the driving sheave 17 and its engagement with the belt 21. There are formed in the driving bell 23 a plurality of angularly spaced-apart radially directed channels or grooves 26, in each of which there is confined a centrifugal weight 27, which, under the influence of rotation of the bell 23, can move outwardly centrifugally from the dotted line position of FIG. 1 to the full line position, which movement is effective to cause axial movement of the shiftable sheave section 19 from the dotted line position of FIG. 1 to the full line position. The outer end of the driving bell hub 24 is formed with a central pocket 28 through which the reduced portion of the driving shaft 15 projects and which end portion of the shaft 15 has axially slidably mounted thereon a headed bushing 29 which engages and is held fast to the circular mid portion of a spider 30. The spider 30 has a plurality of radially projecting arm portions which overlie portions of the head of the driving bell 23 and coincide in position with the positions of the channels 26 in the driving bell. The outer end portion of each arm of the spider 30 is formed as a finger 31, to the outer end portion of which a pin 32 is flexibly secured. The axes of the pins 32 are at right angles to the plane of the spider 30 and the same extend slidably through bores 33 therefor in the head end of the driving bell 23 and are susceptible, upon movement of the spider 30 relative to the shaft 15, of being projected from the dotted line position of FIG. 1 to the full line position of FIG. 1 so as to confine the centrifugal weights 27 in their innermost positions and prevent the same from being thrown outwardly by centrifugal action, which is necessary under certain conditions of operation. Springs 34 coiled about pins 32 bear against the inner face of the spider and normally urge the spider 30 to its dotted line position toward the left in FIG. 1 in which position the pins 32 are retracted so as not to interfere with outward centrifugal movement of the weights 27. The expansive force of the springs 34 can, however, be overcome so as to cause the spider to be slid toward the right in FIG. 1 from its dotted line position to the full line position to cause the pins to be effective in blocking the centrifugal weights 27, by a pair of integrally connected arms 35 which are carried at their inner ends fast on the intermediate portion of a rock shaft 36, which rock shaft extends diametrically across the spider at the head end of the driving bell and is journalled in bearing brackets 37. The connections, extending to the instrument panel of the vehicle equipped with the improved apparatus, for manually rocking the shaft 36 to cause inward movement of the spider 30 and pins 32 against the force of the springs 34, will be described hereinafter.

The stock of the driving bell 23, between the spaced radially directed ball-confining channels 26 is formed with a plurality of spaced bosses having bored bushings 38 therein whose axes are parallel to the driving shaft 15. Mounted through each driving bell bushing 38 is the intermediate portion of a driving pin 39 whose inner end portion is secured to a portion of the shiftable section 19 of the primary sheave 17. The outer end portions of said driving pins 39 are secured to and carry spring retaining plates 40. Confined coiled springs 41, which exert expansive forces less than the centrifugal force of the weights 27, bear against the inner faces of the retaining plates 40, and when the centrifugal weights are in their normal positions the springs exert sufficient force to cause the driving pins 39 to assume the positions shown in broken lines in FIG. 1 (shifted toward the left) which permits the shiftable section 19 of the primary sheave to be in its spread broken line position of FIG. 1.

The driven variable sheave 20 is formed as two relatively movable sections comprising a fixed pulley section 42 and a movable pulley section 43. The movable pulley or sheave section 43 is keyed to the fixed sheave section 42 through cam surfaces 68, cam rollers 66 and stub shafts 67 so as to turn with the fixed sheave and to be susceptible of sliding axial movement on said shaft 16 to move from the full line position of FIG. 1 to the broken line position, and vice versa. A confined coiled spring 44 bearing against an inner face portion of the movable sheave section 43, will normally urge it toward the broken line position of FIG. 1 wherein the driven sheave 20 will have its greatest effective diameter. The fixed sheave section 42 is carried fast by the driven shaft 16. The driven shaft 16 is actually tubular and encloses an inner fixed shaft 45 which is affixed to a frame portion 46 of the assemblage and thereby provides a mounting means for the driven sheave assemblage. A portion of the driven shaft 16, adjacent the sheave 20, carries a sprocket 47 engaged by a chain 48 which transmits power to the driving wheel or wheels (not shown) of the motor vehicle.

Figure 6:
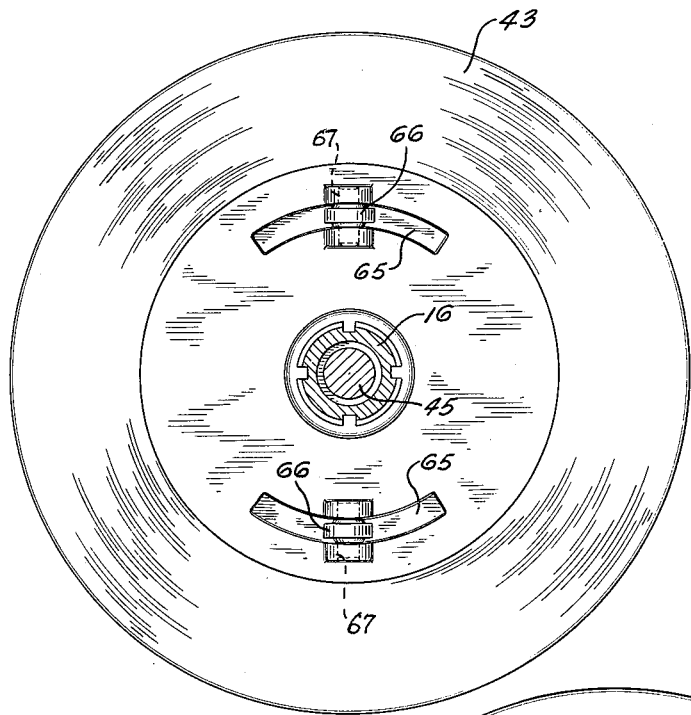
FIG. 6 is a detail sectional view taken on line 6—6 of FIG. 1 on a reduced scale.
Figure 7:
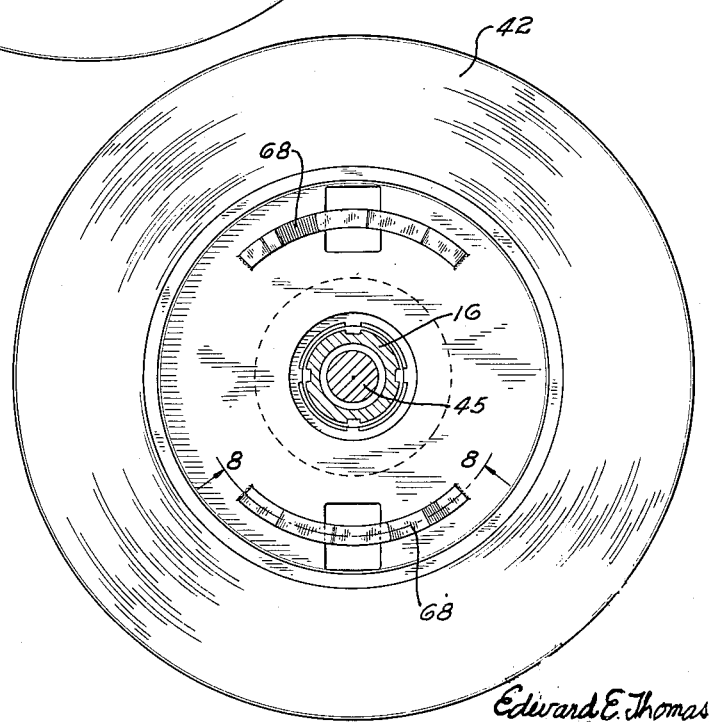
FIG. 7 is a similar sectional view taken on line 7—7 of FIG. 1.
Figure 8:
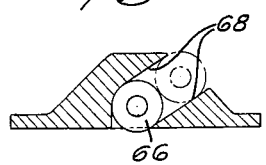
FIG. 8 is an enlarged, fragmentary detail sectional view taken on line 8—8 of FIG. 7.

The torque responsive means for the driven sheave is shown in detail in FIGS. 6, 7 and 8. As will appear from FIG. 6, the inner face of the movable sheave section 43 is formed with opposed arcuate grooves 65 which accommodate cam rollers 66, the cam rollers 66 being carried by stub shafts 67 mounted in bearing brackets therefor on the sheave section 43.

In FIGS. 7 and 8 there is illustrated the inner face portion of the fixed sheave section 42 of the driven sheave 20 which is provided with arcuately directed cam surfaces or tracks 68 corresponding in position to the grooves 65 in sheave section 43. The rollers 66 ride on cam surfaces 68. When the engine of the motor vehicle is producing insufficient torque, the drag of the vehicle, acting on the rear wheels, acts as braking force or excessive load on the engine. This momentarily makes the driven sheave a driving sheave which, through the cam tracks 68 acting on the cam rollers 66, forces the movable sheave section 43 of the driven sheave 20 to move toward the fixed sheave 42, thereby increasing the effective diameter of the driven sheave. Simultaneously, there is a decrease in the effective diameter of the driving sheave, thereby shifting the transmission into its "low gear" position and allowing the engne to provide enough torque to overcome the weight or drag of the vehicle. When the resistance mentioned is overcome, the reverse action takes place because the engine is able to increase its speed of operation and through the automatic transmission the effective diameter of the driving sheave is changed, which results in the effective diameter of the driven sheave being reversed and reduced. The operation just described, which brings into play the torque responsive mechanism in the driven sheave, may result from various conditions such as climbing a hill or from an excessive load, or the like.

As was noted heretofore, there is mounted adjacent the driving bell 23 of the control mechanism, the rock shaft 36 which carries the spider shifting arms 35. An outer end portion of the rock shaft 36 has secured thereto the inner end portion of a lever arm 49 whose outer end portion has affixed thereto a connecting protuberance 50 to which is affixed one end portion of a Bowden control 51 (see FIG. 3). Mounted at any convenient location on the vehicle, as on a control panel 52, is a manual control lever 53, the latter having its inner end pivotally mounted on the support or panel 52, as at 54. The other end portion of the Bowden control 51 is affixed to an intermediate portion of the control lever 53, as at 55. The outer end portion of the control lever 53 carries a knob 56 for manual manipulation of the control lever and a portion of the control lever, inwardly of its outer extremity, is formed with a bifurcated lateral plate portion 57 having an arcuate slot 58 therein.

A starter operating rope or cable 59 extends slidably through the panel or support 52 and its outer end carries an operating knob 60 with a reduced shank portion 62 having thereon a flange or collar 61 spaced so that when the control lever 53 is swung from the full line position of FIG. 3 to the broken line position of FIG. 3 the reduced shank portion 62 will be received by the slot 58 of the lateral plate portion 57 of the lever, but the flange 61 on the starter operating knob shank underlies the stock of the lateral plate portion 57 adjacent the slot to lock the starter rope handle against being pulled outwardly. This arrangement will, therefore, prevent a pull on the starter rope 59 when the control lever 53 is in the broken line position of FIG. 3.

In an internal combustion engine operated motor vehicle equipped with the improved automatic transmission, when the engine is initially started through an outward pull on the starter rope 59, the control lever 53 should be in the full line position of FIG. 3. In this original position of the control lever 53, through the Bowden control 51, the rock shaft 36 will be in a position wherein the arms 35 are in the full line position of FIG. 1, which forces the spider 30 and centrifugal weight controlling pins 32 to the full line position shown wherein the force of the springs 41, acting on the spring retaining plates 40, through the driving pins 39, will cause the shiftable sheave section 19 to be in its spread or broken line position relative to the fixed sheave section 18. In this condition the belt 21 will seat deeply within the groove of the driving sheave 17 resting on an idling bearing 69 which is fast on the shaft 15. The sections of the driven sheave 20 will be close together so that the belt will engage the groove of the driven sheave in a position approaching the maximum effective radius thereof. With this arrangement, the engine of the vehicle is started in the conventional manner through a pull on the starter rope 59 and the engine can be initially speeded up without obtaining forward motion of the vehicle through the automatic transmission, because the centrifugal weights 27 are locked in their innermost positions by the pins 32, and hence do not then react against surface portions of the shiftable sheave section 19 allowing the belt to remain on the idling bearing 69 which does not transmit power. Rotary motion from the driving shaft 15 via the driving bell 23 is, however, transmitted to the sheave section 19 by the driving pins 39. After the vehicle engine has been suitably warmed up, the engine r.p.m. is reduced by means of a throttle (not shown) and the control lever 53 is manually shifted from the full line position of FIG. 3 to the broken line position of FIG. 3 which, through the Bowden control 51, lever 49 and rock shaft 36, swings the arms 35 from the full line position of FIG. 1 to the broken line position whereby the springs 34 become effective to shift the spider 30 from the full line position shown to the broken line position which disengages the pins 32 from the centrifugal weights 27 and allows said weights to be thrown radially outwardly in their channels 26 by centrifugal action, following speeding up of the engine, until they ultimately reach the full line position of FIG. 1. In moving to this position said centrifugal weights 27, bearing against surface portions of the shiftable sheave section 19, gradually move said sheave section 19 toward the right relative to FIG. 1 to cause the belt 21 to ride outwardly in the groove of the sheave approaching the maximum effective radius thereof, with a corresponding reverse change in the driven sheave 20 to develop greater speed of rotation of the driven shaft 16. It should be observed that when the control lever 53 is shifted to the broken line position of FIG. 3, it then lockingly engages the shank of the starter rope handle, as previously described, preventing operation of the recoiling starter rope.

With further reference to FIGS. 1 and 2, it will be observed that the inner end portions of pins 63 are adjacent spaced-apart outer face portions of the shiftable sheave section 19, and said pins extend reciprocatably through openings therefor in the driving bell 23 remote from the centrifugal weights 27, and have their outer ends anchored to the spider 30. Through a manual movement imparted to said spider 30 by further movement of the arms 35, it is possible to project said pins 63 toward the right relative to FIG. 1 into impingement with the sheave section 19 to manually shift the sheave section 19 toward the sheave section 18. This manual movement of the shiftable sheave section 19 through said pins 63 makes it possible to bring the sheave section 19 into driving engagement with the belt 21, whereby the vehicle's engine can be started by pushing the vehicle. In this situation the lever 53 is moved to the broken line position shown at the right in FIG. 3. Without this arrangement it would be impossible to effect a push start of the vehicle because the belt is not tightly or drivingly engaged by both sections of the primary sheave 17 when said sheave is spread.

It should be understood that if the vehicle engine is idling but revolving the driving shaft 15 slowly, the spread-apart sections of the primary sheave 17 will be driven but the belt 21 will merely slide or slip in the enlarged sheave groove on the idling bearing 69. To drive the belt and transmit power to the driven sheave 20 and its shaft, it is necessary to tightly engage the belt in the groove of the primary sheave through the action of the centrifugal weights 27 in moving outwardly to force the shiftable section 19 of the sheave 17 toward its fixed section, or to manually shift said sheave section 19 through the use of the auxiliary pins 63. The centrifugal weights 27 do not contribute to imparting revolution to the sheave section 19, as this is accomplished by the pins 39 which are carried by the driving bell 23.

It is believed that the operation and control of the improved automatic power transmission is clear from the foregoing description. It should also be understood that the mechanism, especially suited for a light motor vehicle, includes a variable pitch primary or driving sheave which has its effective radius controlled by centrifugal means. The latter are susceptible of being locked out or released manually. The automatic power transmission automatically shifts from "low" to "high" gear and permits the motor vehicle engine to be started by a conventional rope starter or by subjecting the vehicle to a push start. Also, when the centrifugal means for the variable primary sheave is locked out, the motor of the vehicle can be initially speeded up prior to obtaining forward motion of the vehicle. The improved automatic power transmission is compact, light, and efficient in operation and is well suited for the purposes set forth.

What is claimed as the invention is:

1. In a power transmission apparatus, in combination, a driving shaft; a driven shaft; a secondary, torque responsive variable sheave operatively carried by the driven shaft; a speed responsive primary variable sheave operatively carried by the driving shaft; a belt connecting said sheaves, said primary variable sheave including: a first sheave section fixed relative to said driving shaft for rotation therewith, and a second sheave section axially shiftably mounted on said driving shaft and relative to said first sheave section to vary the effective diameter of the two sheave sections with respect to engagement with said belt; a driving bell mounted fast on a portion of said driving shaft adjacent the outer face of said shiftable sheave section and having spaced-apart guideways therein; centrifugal means movably mounted in the guideways of said driving bell and moved outwardly therein by accelerated rotation of the bell for automatically engaging and shifting said second sheave section axially; a control plate axially movably mounted on the driving shaft adjacent the outer end of the driving bell; and protuberances carried by said control plate and extending slidably through said outer end of the driving bell into the guideways therein to obstruct or release said centrifugal means according to the axially shifted position of said control plate.

2. In a power transmission apparatus, in combination, a driving shaft; a driven shaft; a secondary, torque responsive variable sheave operatively carried by the driven shaft; a speed responsive primary variable sheave operatively carried by the driving shaft; a belt connecting said sheaves, said primary variable sheave including: a first sheave section fixed relative to said driving shaft for rotation therewith, and a second sheave section axially shiftably mounted on said driving shaft and relative to said first sheave section to vary the effective diameter of the two sheave sections with respect to engagement with said belt; a driving bell mounted fast on a portion of said driving shaft adjacent the outer face of said shiftable sheave section and having spaced-apart guideways therein; centrifugal means movably mounted in the guideways of said driving bell and moved outwardly therein by accelerated rotation of the bell for automatically engaging and shifting said second sheave section axially; a control plate axially movably mounted on the driving shaft adjacent the outer end of the driving bell; protuberances carried by said control plate and extending slidably through said outer end of the driving bell into the guideways therein to obstruct or release said centrifugal means according to the axially shifted position of said control plate, and means extending remote from said control plate for manually shifting the same axially on the driving shaft.

3. An automatic power transmission, comprising a speed responsive variable sheave to operatively interconnect a driving shaft and a power transmitting belt, said sheave including a first sheave section fixed relative to said driving shaft for rotation therewith, and a second sheave section axially shiftably mounted on said driving shaft relative to said first sheave section to vary the effective diameter of the two sheave sections with respect to engagement with said belt, centrifugal means operatively interposed between said driving shaft and the second sheave section for automatically shifting said second sheave section axially in response to speed of rotation increases of the driving shaft, manually controlled means for rendering said centrifugal means inoperative, and manually operated means for shifting said second sheave section axially toward said first sheave section when the centrifugal means is rendered inoperative.

4. In a power transmission apparatus, in combination, a driving shaft; a driven shaft; a secondary, torque responsive variable sheave operatively carried by the driven shaft; a speed responsive primary variable sheave operatively carried by the driving shaft; a belt connecting said sheaves, said primary variable sheave including: a first sheave section fixed relative to said driving shaft for rotation therewith, and a second sheave section axially shiftably mounted on said driving shaft and relative to said first sheave section to vary the effective diameter of the two sheave sections with respect to engagement with said belt; a driving bell mounted fast on a portion of said driving shaft adjacent the outer face of said shiftable sheave section and having spaced-apart, outwardly projecting guideways therein; centrifugal weights movably mounted in the guideways of said driving bell and moved outwardly therein by accelerated rotation of the bell for automatically engaging and shifting said second sheave section axially; a control plate yieldingly axially movably mounted on the driving shaft adjacent the outer end of the driving bell; protuberances carried by said control plate and extending slidably through said outer end of the driving bell into the guideways therein to obstruct or release said centrifugal weights according to the axially shifted position of said control plate, means for manually shifting the control plate axially on the driving shaft, and means carried by the second sheave section and yieldingly axially shiftably mounted in the driving bell for connecting the second sheave section with the driving bell for rotation therewith.

5. In a power transmission apparatus, a speed responsive variable sheave to operatively interconnect a shaft and a belt, said sheave comprising: a first sheave section fixed relative to said shaft for rotation therewith; a second sheave section co-operative with said first sheave section for engagament with said belt, said second sheave section being movable axially relative to the first sheave section to vary the effective diameter of the two sheave sections with respect to engagement with said belt; a driving bell fixed relative to said shaft adjacent said second sheave section for rotation with the shaft; centrifugal means movable outwardly within said driving bell into contact with said second sheave section to shift the latter axially to increase the effective diameter of the sheave section; means for selectively preventing outward movement of said centrifugal means to render the same temporarily inoperative; and axially yieldable rotation transmitting means conecting the second sheave section with said driving bell.

6. In a power transmission apparatus, a speed responsive variable sheave to operatively interconnect a shaft and a belt, said sheave comprising: a first sheave section fixed relative to said shaft for rotation therewith; a second sheave section co-operative with said first sheave section for engagament with said belt, said second sheave section being movable axially relative to the first sheave section to vary the effective diameter of the two sheave sections with respect to engagement with said belt; a driving bell fixed relative to said shaft adjacent said second sheave section for rotation with the shaft; centrifugal weights confined within said bell and movable radially outward therein into forceful contact with said second sheave section to shift the latter axially to increase the effective diameter of the sheave sections; manually operated means for engaging said weights to prevent outward centrifugal movement thereof; means extending to said second sheave section for manually shifting the same axially toward said first sheave section for belt driving engagement; and rotation transmitting means connecting the second sheave section with said driving bell.

7. In a power transmission apparatus, in combination, a driving shaft; a driven shaft; a secondary, torque responsive variable sheave operatively carried by the driven shaft; a speed responsive primary variable sheave operatively carried by the driving shaft; a belt connecting said sheaves, said primary variable sheave including: a first sheave section fixed relative to said driving shaft for rotation therewith, and a second sheave section axially shiftably mounted on said driving shaft and relative to said first sheave section to vary the effective diameter of the two sheave sections with respect to engagement with said belt; a driving member mounted fast on a portion of said driving shaft adjacent the outer face of said shiftable sheave section to rotate with said shaft; centrifugal means movably carried by said driving member and moved outwardly relative thereto by accelerated rotation of the driving member for automatically engaging and shifting said second sheave section axially; a control member axially movably mounted on the driving shaft adjacent the driving member; and protuberances carried by said control member and extending slidably into the driving member and adjacent the centrifugal means to obstruct or release the latter according to the axially shifted position of said control member.

References Cited in the file of this patent

UNITED STATES PATENTS

| | | |
|---|---|---|
| 2,135,214 | Moore | Nov. 1, 1938 |
| 2,299,889 | Fishburn | Oct. 27, 1942 |
| 2,328,088 | Magee | Aug. 31, 1943 |
| 2,553,505 | Miner | May 15, 1951 |
| 2,651,210 | Clark | Sept. 8, 1953 |
| 2,678,566 | Oehrli | May 18, 1954 |
| 2,715,842 | Homuth | Aug. 23, 1955 |
| 2,795,962 | Uher | June 18, 1957 |

FOREIGN PATENTS

| | | |
|---|---|---|
| 429,314 | Italy | Jan. 21, 1948 |